United States Patent [19]

Imahashi

[11] 4,396,730

[45] Aug. 2, 1983

[54] FIRE-RETARDING RESIN COMPOSITION AND FIRE RETARDANT COMPOSITION

[75] Inventor: Takeshi Imahashi, Takamatsu, Japan

[73] Assignee: Kyowa Chemical Industry Co., Ltd., Tokyo, Japan

[21] Appl. No.: 323,130

[22] Filed: Nov. 19, 1981

[30] Foreign Application Priority Data

Nov. 20, 1980 [JP] Japan ................................ 55-162691

[51] Int. Cl.$^3$ ........................... C08K 3/22; C08K 9/04
[52] U.S. Cl. ................................ 523/200; 106/308 F; 252/609; 260/DIG. 24; 523/205; 524/394; 524/399; 524/400; 524/436; 524/570; 524/583; 524/584; 524/586
[58] Field of Search ................ 523/200, 205; 528/489, 528/486; 524/394, 399, 400, 436; 252/609; 106/308 F; 260/DIG. 24

[56] References Cited

U.S. PATENT DOCUMENTS

| | | | |
|---|---|---|---|
| 4,067,847 | 1/1978 | Yui et al. | 524/436 |
| 4,098,762 | 7/1978 | Miyata et al. | 524/436 |
| 4,126,593 | 11/1978 | Takahashi | 524/436 |
| 4,160,751 | 7/1979 | Bock et al. | 524/394 |

FOREIGN PATENT DOCUMENTS

| | | | |
|---|---|---|---|
| 51-47033 | 4/1976 | Japan | 523/200 |
| 53-81552 | 7/1978 | Japan | 523/200 |

OTHER PUBLICATIONS

Chemical Abstracts, vol. 84, No. 4, Jan. 26, 1976, Item 18498n.
Chemical Abstracts, vol. 89, No. 2, Jul. 10, 1978, Item 7107m.

*Primary Examiner*—Ronald W. Griffin
*Attorney, Agent, or Firm*—Sherman & Shalloway

[57] ABSTRACT

A fire-retarding resin composition composed of
(a) a thermoplastic resin,
(b) about 20 to about 60% by weight, based on the total weight of (a), (b) and (c), of a magnesium hydroxide powder whose surface is treated with an alkali metal oleate, and
(c) about 0.1 to about 10% by weight, based on the total weight of (a), (b) and (c), of at least one fatty acid metal salt selected from the group consisting of magnesium oleate and aluminum oleate; and a fire retardant composition for thermoplastic resins, said composition comprising
(b) a magnesium hydroxide powder whose surface is treated with an alkali metal oleate, and
(c) at least one fatty acid metal salt selected from the group consisting of magnesium oleate and aluminum oleate, the weight ratio of (b) to (c) being from 2 to 600:1.

12 Claims, No Drawings

FIRE-RETARDING RESIN COMPOSITION AND FIRE RETARDANT COMPOSITION

This invention relates to a thermoplastic resin composition containing magnesium hydroxide as a fire retardant, which has satisfactory fire retardancy in combination with certain excellent properties, such as moldability, appearance and strength, which are normally difficult to retain in fire-retarding resin compositions containing magnesium hydroxide as a fire retardant. Specifically, it relates to a fire-retarding resin composition containing magnesium hydroxide, which has improved fire retarding properties including resistances to flaming, flowing and dripping together with excellent moldability, appearance and strength, and to a fire retardancy-improving agent for thermoplastic resins which is particularly suitable for the provision of the aforesaid fire-retarding thermoplastic resin composition.

More specifically, this invention pertains to a fire-retarding resin composition comprising
(a) a thermoplastic resin,
(b) about 20 to about 60% by weight, based on the total weight of (a), (b) and (c), of a magnesium hydroxide powder whose surface is treated with an alkali metal oleate, and
(c) about 0.1 to about 10% by weight, based on the total weight of (a), (b) and (c), of at least one fatty acid metal salt selected from the group consisting of magnesium oleate and aluminum oleate.

The invention also pertains to a fire retardant composition for thermoplastic resins, comprising (b) a magnesium hydroxide powder whose surface is treated with an alkali metal oleate and (c) at least one fatty acid metal salt selected from the group consisting of magnesium oleate and aluminum oleate, the weight ratio of (b) to (c) being from 2 to 600:1.

Preferably, the magnesium hydroxide powder in the aforesaid fire-retarding resin composition and the fire retardant composition has
(i) a BET specific surface area of from about 1 to about 20 m$^2$/g, and
(ii) a $\bar{x}/\epsilon_B$ ratio, which is the ratio of its average second order particle diameter determined by the LUZEX method to its average second order particle diameter ($\epsilon_B$) calculated from the BET specific surface area, of not more than about 2.

Fire-retarding thermoplastic resin compositions containing magnesium hydroxide as a fire retardant have hitherto been known, and it is well known that the inclusion of a relatively large amount of magnesium hydroxide can impart good fire retardancy. It is known on the other hand that the addition of magnesium hydroxide in a relatively large amount which can impart satisfactory fire retardancy to thermoplastic resins causes various troubles, for example the deterioration of moldability, appearance, mechanical strengths and other desirable properties inherent to the resins.

Various attempts have been made in the past to use auxiliary additives with a view to solving such a contradictory technical problem. However, these attempts have been unsuccessful or resulted in new technical drawbacks, and have not led to industrially satisfactory techniques.

For example, Japanese Laid-Open Patent Publication No. 119848/1975 suggests a self-extinguishing resin composition suitable for injection molding which is obtained by blending a polyolefin resin containing as much as 45 to 65% by weight of magnesium hydroxide, particularly a polyolefin resin whose melt index has decreased to 0.1 g/10 min. or below as a result of incorporating magnesium hydroxide in such a large amount, with 1 to 6% by weight, preferably 1.5 to 3% by weight, based on the magnesium hydroxide, of an aluminum, zinc, magnesium or calcium salt of a fatty acid having 8 to 20 carbon atoms as a slip agent to increase the melt index of the polymer to 1 g/10 min. or more. This patent document, however, fails to make any specific reference to the fire retarding properties of the resin composition including resistances to flaming, glowing and dripping. The slip agents specifically disclosed therein are magnesium stearate, zinc stearate, calcium stearate, aluminum distearate, calcium palmitate, zinc arachidate, magnesium myristate and zinc behenate. This patent document is quite silent on the metal salts of oleic acid and the surface treatment of magnesium hydroxide.

Japanese Laid-Open Patent Publication No. 12943/1978 points out that according to the technique suggested by the above-cited Japanese Laid-Open Patent Publication No. 119848/1975, the fire retardancy of the composition is generally low, and the extent of improvement of moldability is small where the deterioration of fire retardancy is small. Japanese Laid-Open Patent Publication No. 12943/1978 contemplates the provision of a fire-retarding polyolefin composition having fire retardancy, toughness and injection moldability in a well-balanced combination and discloses a composition prepared by blending a polyolefin resin composition containing 40 to 70% by weight of magnesium hydroxide with 3 to 20% by weight, preferably 6 to 15% by weight, based on the magnesium hydroxide, of a metal soap and 0.3 to 20% by weight, preferably 1 to 15% by weight, based on the magnesium hydroxide, of an alkali metal salt of an organic carboxylic acid. In this patent document, stearates, oleates, palmitates, linolates, ricinolates, laurates, caprylates, behenates and montanates are exemplified as the metal soap, and aluminum, calcium, magnesium, zinc, barium, cobalt, lead, tin, titanium and iron are cited as examples of the metal portion of the soap. The patent publication recommends the use of aluminum distearate as being particularly good among the many metal soaps. Most of the specific working examples in the patent publication cover the use of aluminum distearate, and the other examples show the use of magnesium, calcium or zinc stearate, aluminum tristearate, magnesium laurate, magnesium palmitate and magnesium montanate. But no example of using oleate salts is shown. In particular, this patent publication fails to refer to magnesium oleate and aluminum oleate. In addition, the patent publication fails to disclose the surface treatment of magnesium hydroxide.

The present inventor has made investigations in order to develop a fire-retarding resin composition having both excellent fire retardancy and other excellent properties inherent to the resin, and a first retardant used therefor.

These investigations have led to the discovery that by blending a thermoplastic resin with a fire retardancy-improving agent composed of a magnesium hydroxide powder surface-treated with an alkali metal oleate and at least one metal salt of a fatty acid metal salt selected from the group consisting of magnesium oleate and aluminum oleate, there can be provided a fire-retarding resin composition containing magnesium hydroxide having overall fire retarding properties involving excellent resistances to flaming, glowing and dripping in combination with excellent moldability and the excellent appearance and Izod impact strength of molded articles prepared therefrom.

Japanese Laid-Open Patent Publication No. 12943/1978 shows by a comparative experiment that when the metal soap proposed in Japanese Laid-Open Patent Publication No. 119848/1975 described as a prior art technique in the above Japanese patent document are incorporated in amounts sufficient to improve the moldability of an olefin resin, the fire retardancy of an olefin resin composition containing magnesium hydroxide is deteriorated unnegligibly. The investigations of the present inventors have shown that by incorporating a combination of a magnesium hydroxide powder surface-treated with an alkali metal oleate which is not at all recognized in the prior art and at least one fatty acid metal salt selected from the group consisting of magnesium oleate and aluminum oleate into a thermoplastic resin, it is possible to improve overall fire retarding properties involving resistances to flaming, glowing and dripping as well as moldability, appearance and Izod impact strength.

It has also been found that the combination of the magnesium powder surface-treated with an alkali metal oleate and magnesium oleate and/or aluminum oleate shows an excellent improving effect which is quite unexpected from the effect of aluminum distearate shown as an excellent slip agent in the above cited Japanese Laid-Open Patent Publication No. 119848/1975 and recommended as being especially excellent.

It is an object of this invention therefor to provide a fire-retarding resin composition containing surface-treated magnesium hydroxide which has improved fire retardancy in combination with certain excellent properties.

Another object of this invention is to provide a fire retardancy improving agent for thermoplastic resins, which is suitable for the provision of the aforesaid fire-retarding thermoplastic resin composition.

The above and other objects and advantages of the invention will become more apparent from the following description.

According to this invention, there is provided a fire-retarding resin composition comprising (a) a thermoplastic resin, (b) about 20 to about 60% by weight, preferably about 30 to about 55% by weight, based on the total weight of (a), (b) and (c), of a magnesium hydroxide powder whose surface is treated with an alkali metal oleate, and (c) about 0.1 to about 10% by weight, preferably about 0.5 to about 6% by weight, especially preferably about 1 to about 5% by weight, of at least one fatty acid metal salt selected from the group consisting of magnesium oleate and aluminum oleate.

The invention also provides a fire retardant composition for thermoplastic resins, said composition comprising (b) a magnesium hydroxide powder whose surface is treated with an alkali metal oleate and (c) at least one fatty acid metal salt selected from the group consisting of magnesium oleate and aluminum oleate, the weight ratio of (b) to (c) being from 2 to 600:1, preferably from 3 to 120:1.

Magnesium hydroxide powder not surface-treated with an alkali metal oleate has poor compatibility with resins, and its poor dispersion in resins causes nonuniformity of the fire retardancy of molded articles, or reduces the melt index of the resin. Hence, the flowability of the resin during molding is reduced, and the molded articles have poor appearance and reduced impact strength. Because of these disadvantages, the use of the surface-treated magnesium hydroxide powder (b), in combination with the magnesium oleate and/or aluminum oleate (c), is essential in this invention.

If the amount of the surface-treated magnesium hydroxide (b) becomes excessive beyond the above-specified limit, there is no further appreciable improvement in fire retardancy, and mechanical properties such as impact strength and moldability tend to be deteriorated rapidly. If the amount of the surface-treated magnesium hydroxide is lower than the specified limit, sufficient fire retardancy cannot be obtained and the modulus of elasticity cannot be improved satisfactorily. Accordingly, the above-specified range is recommended.

If the amount of the magnesium oleate and/or aluminum oleate is smaller than the above-specified limit, it is difficult to achieve excellent fire retardancy in combination with other excellent properties. The use of the additive (c) in an excessive amount does not contribute to further improvement. Rather, if it is used in too excessive an amount, bleed-out is likely to occur in the resulting molded articles. The additive (c) should therefore be used within the above quantitative range depending upon the type of the thermoplastic resin and the properties and amount of magnesium hydroxide.

The magnesium hydroxide used in preparing the surface-treated magnesium powder (b) is preferably a powder of magnesium hydroxide which has (i) a BET specific surface area of about 1 to about 20 $m^2/g$, preferably about 1 to about 10 $m_2/g$, and (ii) a $\bar{x}/\epsilon_B$ ratio, which is the ratio of its average second order particle diameter ($\bar{x}$) determined by the LUZEX method to the average second order particle diameter ($\epsilon_B$) calculated from the BET specific surface area, of not more than about 2, preferably not more than about 1.5.

In the present invention, the LUZEX method average second order particle diameter ($\bar{x}$) and the average second order particle diameter ($\epsilon_B$) from the BET specific surface area are determined by the following procedure.

(1) Measurement and determination of the LUZEX method average second order particle diameter ($\bar{x}$):

A dry sample is fully mixed, and about 0.5 to 1.0 mg of it is placed on a glass plate. The same amount of a dispersing medium (DisLite, a trademark) is added and kneaded with the sample. The mixture is then diluted uniformly with a small amount of a dispersion (cyclohexanol). One drop (1–2 mm in diameter) of the diluted mixture is put on a slide glass. A cover glass is put over it and held lightly to cause the liquid to adhere uniformly to the glass plate. Under a microscope, the particle size is measured.

The magnification of the microscope is 400x (the magnification of the objective is 40x). The system mode of a 401 particle counter is adjusted to an overcounting mode, and the number of particles having a maximum horizontal chord length above an arbitrarily prescribed size is counted. The counting is repeated by using varying preset sizes. From the measured values, the particle size distribution based on the maximum horizontal chord length is determined. In this particle size distribution, that particle size which corresponds to a cumulative rate of 50% is defined as the average second order particle diameter ($\bar{x}$).

(2) Calculation of the second order particle diameter ($\epsilon_B$) from the BET specific surface area:

Let the BET specific surface area be S (m$_2$/g), the second order particle diameter ($\epsilon_B$) (microns) is calculated from the following equation.

$$\epsilon_B(\text{microns}) = 2.54/S$$

The surface-treated magnesium hydroxide powder (b) used in this invention can be obtained by treating the surface of magnesium hydroxide, preferably magnesium hydroxide satisfying the above characteristics (i) and (ii), with an alkali metal oleate such as sodium oleate or potassium oleate.

The surface treatment of the magnesium hydroxide powder with the alkali metal oleate can be performed by the following procedure, for example.

An aqueous solution of sodium oleate (kept at more than about 60° C.) is added to an aqueous suspension of magnesium hydroxide with stirring at a temperature of more than about 60° C. to bring them into contact with each other for about 30 minutes to about 2 hours. Then, the product is filtered, washed with water and dried. Or conversely, magnesium hydroxide may be added to an aqueous solution of sodium oleate, and with stirring, they are brought into contact with each other for the same period of time as above.

Examples of suitable thermoplastic resins which can be used in this invention include polymers or copolymers of $C_2$-$C_8$ olefins (α-olefins) such as polyethylene, polypropylene, an ethylene/propylene copolymer, polybutene and poly(4-methyl-1-pentene), copolymers of these olefins with dienes, polystyrene, ABS resin, AAS resin, AS resin, MBS resin, an ethylene/vinyl chloride copolymer, an ethylene/vinyl acetate copolymer, an ethylene/vinyl acetate/vinyl chloride graft copolymer, polyvinylidene chloride, polyvinyl chloride, chlorinated polyethylene, chlorinated polypropylene, a vinyl chloride/propylene copolymer, polyvinyl acetate, phenoxy resin, polyacetal, polyamides, polyimides, polycarbonates, polysulfones, polyphenylene oxides, polybutylene terephthalate, methacrylic resins, and blends of these in suitable combinations.

The composition of this invention can be provided by uniformly mixing the thermoplastic resin (a), the magnesium hydroxide powder (b) surface-treated with an alkali metal oleate and the magnesium oleate and/or aluminum oleate (c) in the proportions specified hereinabove. Mixing can be carried out by any known kneading means using a roll, a Bunbury mixer, a kneader, a single screw or twin screw extruder, etc. For example, the composition of the invention can be prepared by mixing the above ingredients and kneading and extruding the mixture in the molten state by an extruder.

In addition to the ingredients (a), (b) and (c), the composition of this invention may contain conventional additives depending upon the type of the thermoplastic resin used. Examples of the additives include plasticizers such as dimethyl phthalate, diethyl phthalate, butyl oleate, butyl stearate, di-n-butyl phthalate, n-octyl phthalate, di-2-ethylhexyl phthalate, di-2-ethylhexyl adipate, di-n-decyl adipate, tributyl phosphate, tri-2-ethylhexyl phosphate and epoxidized soybean oil; slip agents such as liquid paraffin, natural paraffin, microwax, polyethylene wax, stearic acid, stearamide, palmitamide, methylenebis-stearamide, ethylenebis-stearamide, oleamide, hardened castor oil, ethylene glycol monostearate, calcium stearate, zinc stearate, butyl stearate and aluminum stearate; heat stabilizers (antioxidants) such as phenyl-α-naphthylamine, dilauryl thiodipropionate, distearyl thiodipropionate, trinonylphenyl phosphite, 2,6-di-tert.butyl-4-methylphenol, 2,4,6-tritert.butyl phenol, 4,4'-thiobis(3-methyl-6-tert.butyl phenol, thiobis(β-naphthol), styrenated phenol, 2,2'-methylenebis(4-methyl-6-tertbutyl phenol), pentaerythrityl-tetrakis[3-(3,5-di-tert.butyl-4-hydroxyphenyl)propionate], 4,4'-isopropylidenebis-phenol, 4,4'-butylidene-bis(6-tert.butyl-3-methyl)stearyl-β-(3,5-di-tert.butyl-4-hydroxyphenyl)propionate, phenol, 1,1-bis-(4-oxyphenyl)cyclohexane and dialkylene trialkyl phenols; ultraviolet stabilizers such as carboxyphenyl salicylate, p-octylphenyl salicylate, p-tert.butyl phenylsalicylate, 2-hydroxy-4-methoxy-benzophenone, 2-ethylhexyl-2-cyano-3,3'-diphenyl acrylate, 2,2'-dihydroxy-4-methoxybenzophenone, 2,2'-dihydroxy-4-octoxy dodecylsalicylate, 2(2'-hydroxy-3',5'-di-tert.butylphenyl)-benzotriazole, benzophenone, 2-hydroxy-4-octoxybenzophenone, 2(2'-hydroxy-5'-methylphenyl)benzotriazole and 4-dodecyloxy-2-hydrobenzophenone; fillers such as calcium carbonate, mica, asbestos, glass spherers, linter, glass fibers, aluminum powder, copper powder, iron powder, siliceous rock, diatomaceous earth, alumina, gypsum, clay, talc, graphite, carbon black, wood flour, barium sulfate, silica gel, dolomite, titanium oxide, barium titanate, iron oxide, and silicon carbide; coloring agents such as Rhodamine Lake, Methyl Violet Lake, Cinquasia Violet, yellow lead, Chrome Vermilion, Prussian Blue, Cadmium Yellow, Cadmium Red, Cromophthal Red, Cromophthal Yellow, Phthalocyanine Blue, Phthalocyanine Green, titanium oxide, red iron oxide, iron black, zinc flower, barium sulfate, zinc sulfate, ultramarine, Indanthrene Blue, Thioindigo Bordeux, Cinquasia Red, Eosine Lake, Quinoline Yellow, calcium silicate, cobalt violet, carbon black, benzidine yellow, Hansa Yellow, Vulcan Orange, Permanent Red F5R, Carmine 6B, and Lake Red C; antistatic agents such as pentaerythritol monostearate, sorbitan monopalmitate, sulfonated oleic acid, phosphate esters, lauryl trimethyl ammonium chloride, alkyldimethyl betaines, aliphatic amines, alkylphenols, alkyldihydroxyethyl betaines, sulfobetaine, fatty acids, and fatty acid amides; and fibrous reinforcing materials such as asbestos, glass fibers, linter, potassium titanate, fibrous magnesium hydroxide, fibrous magnesium oxide, alumina whiskers, and carbon fibers.

The amounts of the other additives may be selected properly, and are, for example, about 10 to about 60% by weight for the plasticizers, about 0.1 to about 5% by weight for the slip agents, about 0.01 to about 1.0% by weight for the heat stabilizers, about 0.01 to about 1.0% by weight for the ultraviolet stabilizers, about 5 to about 60% by weight for the fillers, about 0.1 to about 5% by weight for the coloring agents, about 0.1 to about 2% by weight for the antistatic agents, and about 5 to about 50% by weight for the fibrous reinforcing material, all based on the weight of the thermoplastic resin (a).

According to the resin composition and the fire retardant composition of this invention, fire retardancy involving resistances to flaming, dripping and glowing can be improved while retaining good practical moldability without imperfections in appearance such as the occurrence of flashes on the surface of the molded articles or without a substantial deterioration in mechanical properties such as impact strength. Furthermore, the amount of magnesium hydroxide can be reduced, and the improved fire-retarding resin composition and molded articles therefrom are safe and free from coloration.

The following examples illustrate the present invention more specifically.

EXAMPLES 1 TO 5 AND COMPARATIVE EXAMPLES 1 AND 2

Magnesium hydroxide having a BET specific surface area of 3.6 m$^2$/g and a $\bar{x}/\epsilon_B$ ratio of 1.05 was added to an aqueous solution of sodium oleate kept at about 80° C. The mixture was stirred for about 30 minutes to coat the surface of the magnesium hydroxide crystals with 3.2% by weight, calculated as oleic acid, of sodium oleate, followed by washing with water and drying. Magnesium dioleate or aluminum dioleate was then added in each of the amounts shown in Table 1 to a mixture of an ethylene/propylene copolymer and the surface treated magnesium hydroxide, and they were mixed. The resulting composition was melted and kneaded by an extruder into pellets. The pellets were injection-molded to form test pieces. The burning property, appearance, Izod impact strength and moldability of the test pieces were determined. The results are shown in Table 1.

The burning test was carried out by using a test piece having a thickness of 3.17 mm in accordance with the UL 94 vertical test.

The notched Izod impact strength was measured by the method of JIS K-7110.

For comparison, the procedure of Example 1 was repeated except that the same magnesium hydroxide as used in Example 1 before surface-treatment was used instead of the surface-treated magnesium hydroxide, and aluminum distearate recommended in the prior art was used instead of the magnesium oleate (Comparative Example 1). The procedure of Comparative Example 1 was repeated except that 3.2% by weight, as stearic acid, of sodium stearate was further added (Comparative Example 2). The results are also shown in Table 1.

EXAMPLE 6

Magnesium hydroxide having a BET specific surface area of 8.2 m$^2$/g and $\bar{x}/\epsilon_B$ ratio of 1.4 was added to an aqueous solution of sodium oleate kept at about 60° C., and the mixture was stirred for about 30 minutes to coat the surface of the magnesium hydroxide with 2.5% by weight, calculated as oleic acid, of sodium oleate. The resulting surface-treated magnesium hydroxide and magnesium dioleate or aluminum dioleate were added in the proportions shown in Table 2 to high-density polyethylene. The mixture was kneaded and extruded in the molten state by an extruder. The resulting pellets were injection-molded to form test pieces. The test pieces were evaluated as in Example 1. The results are shown in Table 2.

EXAMPLES 7 TO 9

Magnesium hydroxide having a BET specific surface area of 4 m$^2$/g and a $\bar{x}/\epsilon_B$ ratio of 0.98 was surface-treated with 3% by weight of sodium oleate in the same way as in Example 6. The surface-treated magnesium hydroxide and magnesium or aluminum dioleate were added in the proportions shown in Table 2 to each of nylon-6, polystyrene, or polypropylene. The mixture was kneaded by an extruder, and the pellets were injection-molded. The molded articles were evaluated as in Example 1. The results are shown in Table 2.

EXAMPLE 10

EPDM rubber and the same magnesium hydroxide as used in Example 1 were roll kneaded in accordance with the following recipe:

| | | |
|---|---|---|
| EPDM | 100 | |
| ZnO | 5 | |
| Stearic acid | 1 | 46 parts by weight |
| TT ⎫ Vulcanization | | |
| M ⎭ accelerator | 1.5 | |
| Sulfur | 0.5 | |
| Magnesium hydroxide | 53 | parts by weight |

TABLE 1

| | Composition (weight %) | | | | Fire retardancy | | | | Properties | |
|---|---|---|---|---|---|---|---|---|---|---|
| | | Surface-treated magnesium | Magnesium oleate | Aluminum oleate | Flaming | | Glowing (seconds) | Drip | Rank | Appearance of a molded article (flash) | Izod impact strength (kg.cm/cm) |
| Example | Polymer | | | | First (seconds) | Second (seconds) | | | | | |
| 1 | 44.5 | 54 | 1.5 | — | 0.8 | 1.7 | 14 | No | V-0 | No | 9.0 |
| 2 | 46 | 52 | 2 | — | 0.9 | 3.3 | 27 | No | V-0 | No | 11.6 |
| 3 | 45 | 50 | 5 | — | 0.7 | 1.2 | 5 | No | V-0 | No | 10.8 |
| 4 | 47 | 50 | 3 | — | 0.9 | 3.2 | 26 | No | V-0 | No | 13.5 |
| 5 | 44 | 53 | — | 3 | 2.1 | 3.7 | 25 | No | V-0 | No | 10.1 |
| Comp. Ex. 1 | 44.5 | 54 (not surface-treated) | Magnesium distearate 1.5 | — | 6.0 | burned | — | Yes | HB | No | 4.7 |
| Comp. Ex. 2 | 44.5 | 50.8 (not surface-treated) and sodium stearate (3.2) | Magnesium distearate 1.5 | — | 4.5 | burned | — | Yes | HB | No | 4.1 |
| Control | 100 | — | — | — | burned | burned | — | Yes | HB | No | 11 |

| | -continued | |
|---|---|---|
| Aluminum oleate | 1.5 | parts by weight |

The kneaded mixture was then vulcanized at 160° C. for 30 minutes. The fire retardancy of the molded product was tested by the method of UL 94VE (⅛ inch thick). The results are shown in Table 2.

Table 2 also shows the results obtained in Comparative Examples 3 to 6 in which the use of magnesium oleate or aluminum oleate was omitted.

4. The composition of claim 1 wherein the alkali metal oleate is sodium or potassium oleate.

5. The composition of claim 4 wherein the alkali metal oleate is sodium oleate.

6. The composition of claim 1 wherein the amount of the magnesium hydroxide powder (b) is from about 30 to about 55% by weight, based on the total weight of (a), (b) and (c); and the amount of the fatty acid metal salt (c) is from about 0.5 to about 6% by weight, based on the total weight of (a), (b) and (c).

7. A fire retardant composition for thermoplastic resins, said composition comprising (b) a magnesium hydroxide powder whose surface is treated with an alkali metal oleate, and (c) at least one fatty acid metal salt selected from the group consisting of magnesium oleate and aluminum oleate, the weight ratio of (b) to (c) being from 2 to 600:1.

TABLE 2

| | | Thermoplastic resin | | Amount of surface-treated magnesium hydroxide (weight %) | Magnesium oleate or aluminum oleate (weight %) | Other additive (weight %) | Flaming | | Glowing (seconds) | Drip | Rank |
|---|---|---|---|---|---|---|---|---|---|---|---|
| | | Type | Amount (weight %) | | | | First (seconds) | Second (seconds) | | | |
| Example | 6 | High-density polyethylene | 47 | 51 | 2 (Mg) | | 6 | 0.8 | 12 | No | V-0 |
| | 7 | Nylon-6 | 65 | 33 | 2 (Mg) | | 0.6 | 0.8 | 6 | No | V-0 |
| | 8 | Polystyrene | 46 | 51 | 3 (Mg) | | 1.8 | 2.5 | 12 | No | V-0 |
| | 9 | Polypropylene | 49.5 | 48 | 1.5 (Mg) | Carbon black (1) | 1.4 | 1.1 | 28 | No | V-0 |
| | 10 | EPDM rubber | 45.5 | 53 | 1.5 (Al) | Carbon black (1.5) | 0.7 | 1.3 | 21 | No | V-0 |
| Comparative Example | 3 | High-density polyethylene | 47 | 53 | | | 7 | burned | | Yes | HB |
| | 4 | Nylon-6 | 65 | 35 | | | 2 | 12 | 120 | No | V-2 |
| | 5 | Polystyrene | 46 | 54 | | | 11 | burned | | Yes | HB |
| | 6 | Polypropylene | 50.5 | 49.5 | | | 13 | burned | | Yes | HB |

I claim:

1. A fire-retarding resin composition composed of
(a) a thermoplastic resin,
(b) about 20 to about 60% by weight, based on the total weight of (a), (b) and (c), of a magnesium hydroxide powder whose surface is treated with an alkali metal oleate, and
(c) about 0.1 to about 10% by weight, based on the total weight of (a), (b) and (c), of at least one fatty acid metal salt selected from the group consisting of magnesium oleate and aluminum oleate.

2. The composition of claim 1 wherein said magnesium hydroxide powder has
(i) a BET specific surface area of about 1 to about 20 m²/g, and
(ii) a $\bar{x}/\epsilon_B$ ratio, which is the ratio of its average second order particle diameter ($\bar{x}$) determined by the LUZEX method to its average second order particle diameter ($\epsilon_B$) calculated from the BET specific surface area, of not more than about 2.

3. The composition of claim 2 wherein the alkali metal oleate is sodium oleate.

8. The composition of claim 7 wherein the magnesium hydroxide has a BET specific surface area of about 1 to about 20 m²/g, and (ii) a $\bar{x}/\epsilon_B$ ratio, which is the ratio of its average second order particle diameter (x) determined by the LUZEX method to its average second order particle diameter ($\epsilon_B$) calculated from the BET specific surface area, of not more than about 2.

9. The composition of claim 8 wherein the alkali metal oleate is sodium oleate.

10. The composition of claim 7 wherein the alkali metal oleate is sodium oleate or potassium oleate.

11. The composition of claim 10 wherein the alkali metal oleate is sodium oleate.

12. The composition of claim 7 wherein the weight ratio of (b) to (c) is from 3 to 120:1.

* * * * *